(12) United States Patent
Dunn

(10) Patent No.: US 7,536,710 B2
(45) Date of Patent: May 19, 2009

(54) APPLICATION-BACKED GROUPS IN A COMMON ADDRESS BOOK

(75) Inventor: Melissa W. Dunn, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 885 days.

(21) Appl. No.: 11/045,449

(22) Filed: Jan. 28, 2005

(65) Prior Publication Data

US 2006/0236372 A1     Oct. 19, 2006

(51) Int. Cl.
G06F 7/04 (2006.01)
G06K 9/00 (2006.01)
H04L 9/32 (2006.01)

(52) U.S. Cl. .......................................... 726/2; 370/752
(58) Field of Classification Search ................ 715/751; 709/318, 206; 345/752; 713/201, 202; 707/3; 726/2, 9; 370/252
See application file for complete search history.

(56) References Cited

U.S. PATENT DOCUMENTS 5,835,089 A * 11/1998 Skarbo et al. ............... 715/751
7,414,981 B2 * 8/2008 Jaramillo et al. ............ 370/252
2003/0145124 A1 * 7/2003 Guyan et al. ................ 709/318
2003/0151623 A1 * 8/2003 Shimada et al. ............. 345/752
2003/0154256 A1 * 8/2003 Hadano et al. .............. 709/206
2004/0158745 A1 * 8/2004 Koizumi ..................... 713/202
2004/0181517 A1 * 9/2004 Jung et al. ..................... 707/3
2005/0044423 A1 * 2/2005 Mellmer et al. ............. 713/201
2006/0026672 A1 * 2/2006 Braun ........................... 726/9
2006/0236372 A1 * 10/2006 Dunn ............................ 726/2
2007/0112915 A1 * 5/2007 Klassen et al. .............. 709/206

OTHER PUBLICATIONS

John C. Tang; extending awareness to mobile users; Year of Publication: 2001; ACM; pp. 221-228.*

* cited by examiner

Primary Examiner—Kambiz Zand
Assistant Examiner—Monjour Rahim
(74) Attorney, Agent, or Firm—Workman Nydegger

(57) ABSTRACT

A computerized method for allowing multiple applications to create groups in a common address book while maintaining control over access to the created group. A creating application creates a group within a shared address book and may provide access logic for access to the group. Additional applications may then send a request to an intermediary component such as an Application Program Interface ("API") for access to the group. The API determines if there is access logic to execute. If there is no logic, access may be granted to the group. If there is access logic, then the logic is executed and access is granted or denied depending on the prerequisites for access found in the logic.

20 Claims, 3 Drawing Sheets

APPLICATION-BACKED GROUPS IN A COMMON ADDRESS BOOK

CROSS-REFERENCE TO RELATED APPLICATIONS

Not applicable.

BACKGROUND OF THE INVENTION

1. The Field of the Invention

The present invention relates to computing technology. More specifically, the present invention relates to mechanisms for allowing multiple applications to create groups within a common address book and allowing other applications access to the group while still maintaining control over access to the groups.

2. The Relevant Technology

Computing technology has revolutionized the way people work and play and has contributed enormously to the advancement of humankind. Computers now aid in enumerable applications such as word processing, computer simulations, advanced gaming, voice recognition, among much more. Computing systems now come in a wide-variety of forms including, for example, desktop computers, laptop computers, Personal Digital Assistants (PDAs), and even mobile telephones and devices.

Many computing systems are configured to support applications such as e-mail or instant messaging that implement an address book. The address book is used by a user of the application (or by the application itself) for a variety of purposes. For example, an e-mail application may use the information to distribute e-mail, or to present options for e-mail recipients, while an instant messaging application may use the information to decide on which participants will be given presence data about which participants. Regardless of the application, the address book allows for quick and easy access to the information stored in the address book.

Individual entries in an address book may represent individuals or resources (e.g., a conference room or other equipment). It is quite common for these individual entries to be organized into "groups" within an address book according to some logical criteria. For example, a group may be a distribution list of related address book entries. For example, a "friends" group may consist of all the address entries for a group creator's close friends. Use of these groups enables the user to efficiently access the information in the address book for an entire group of logically related entries.

While users commonly create groups, the application providing the address book may also create groups, require rules for group membership or simply use the groups created by the user. For example, an instant messaging service may allow the user to create the "friends" group only when the user follows certain rules imposed by the instant messenger provider, such as all members must have an instant messaging addresses within the service provider domain (e.g. AOL, MSN, or YAHOO!). The application that created the group maintains total control of the group. In other words, the application that creates the group also creates rules governing the membership of the group. A user that desires to change group membership conventionally does so within the confines of the application that created the group. For example, an instant messenger application requires that members of an instant messenger group have an instant messenger address for group membership. If a potential new addition to the group does not have an instant messenger address, the instant messaging application does not allow the new addition to the group.

This application-based control of the groups means that each application generally maintains its own address book. This often leads to duplication of information in the various address books, thereby wasting computing resources and complicating the overall user experience.

One solution to this problem would be the use of a common address book available to all applications. This would allow all applications to place within the common address book any groups that the applications had created. However, it would still be desirable for the creating application to maintain control over access to the group. This would prevent one application from modifying a group created by another application without the creating application's permission.

Accordingly, what is desired is a method that allows any application the ability to create and share groups within a common address book while still maintaining control over the access to the groups that were created.

BRIEF SUMMARY OF THE INVENTION

The forgoing problems with the prior state of the art are overcome by the principles of the present invention, which relate to a computerized method for allowing multiple applications to create groups in a common address book while maintaining control over access to the created group. This allows the creating application to determine what criteria (if any) other applications are to meet in order to use or edit a group. Multiple applications can therefore safely store groups within the single address book without the risk of another application accessing a group in a manner not desired by the application that created the group.

A "first" application creates a group within the shared common address book and may provide access logic for access to the group. A "second" application may then request access to the group. The use of terms "first", "second", "third" and so forth to modify an application is not intended to represent any sequential, temporal or spatial ordering of the applications, but is used merely to distinguish one application from another. The requested access may be for writing new information to or about the group, reading an existing entry, viewing or deleting individual entries or groups of entries.

The request for access is made to an intermediary component such as an Application Program Interface ("API"). The API verifies that the group was created by the first application. If this is the case, the API then determines if there is any access logic associated with the first application. The access logic may define prerequisites that the second application must posses in order to have access to the requested group or may define other access logic such as, for example, the definition of an appropriate user interface for displaying the group.

The lack of access logic for execution may be inferred to mean that the creating application intended access for the requesting application. In that case, if the API finds no access logic to execute, the API may simply grant access to the requested group based on this inference. The application may then read, write to, delete or view the contents of the group Alternatively, in the case where the API finds access logic associated with the first application, the API executes the logic. The executed access logic determines if access to the group is proper. For instance, the executed logic may find that the requesting application has not met the prerequisites needed for access to the requested group. In response, the API may deny access and send a message to the second application that it may not have access. The second application may then satisfy the perquisites, and repeat the request if desired.

If, on the other hand, the executed access logic finds that access to the requested group is proper, then the API is directed to grant access to the group. The application may then read, write to, delete or view the contents of the group. Accordingly, the first application has created and shared the group within the common address book, while still maintaining control over the group membership.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Figure 1:
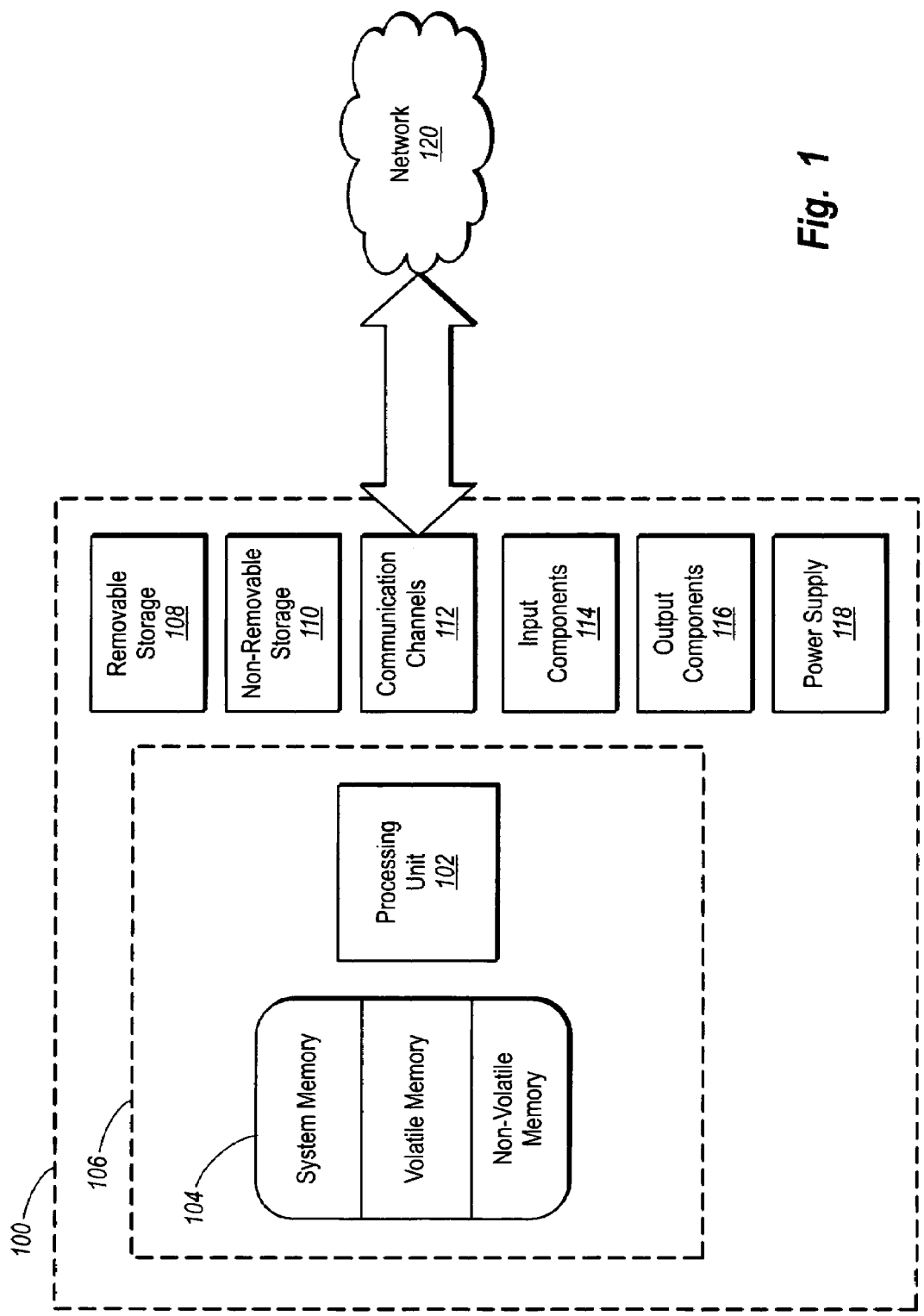
FIG. 1 illustrates a suitable computing environment that may implement the features of the present invention.

The principles of the present invention relate to a method for allowing multiple applications to create groups in a common address book while maintaining control over access to the created group. A first application creates a group within a shared address book and may provide access logic for access to the group. Additional applications may then send a request to an intermediary component such as an Application Program Interface ("API") for access to the group. The API determines if there is access logic to execute. If there is no logic, access may be granted to the group. If there is access logic, then the logic is executed and access is granted or denied depending on the prerequisites for access found in the logic.

Turning to the drawings, wherein like reference numerals refer to like elements, the principles of the present invention are illustrated as being implemented in a suitable computing environment. The following description is based on illustrated embodiments of the invention and should not be taken as limiting the invention with regard to alternative embodiments that are not explicitly described herein.

In the description that follows, embodiments of the invention are described with reference to acts and symbolic representations of operations that are performed by one or more computers, unless indicated otherwise. As such, it will be understood that such acts and operations, which are at times referred to as being computer-executed, include the manipulation by the processing unit of the computer of electrical representing data in a structured form. This manipulation transforms the data or maintains them at locations in the memory system of the computer, which reconfigures or otherwise alters the operation of the computer in a manner well understood by those skilled in the art. The data structures where data are maintained are physical locations of the memory that have particular properties defined by the format of the data. However, while the principles of the invention are being described in the foregoing context, it is not meant to be limiting as those of skill in the art will appreciate that several of the acts and operations described hereinafter may also be implemented in hardware.

FIG. 1 shows a schematic diagram of an example computer architecture usable for these devices. For descriptive purposes, the architecture portrayed is only one example of a suitable environment and is not intended to suggest any limitation as to the scope of use or functionality of the invention. Neither should the computing systems be interpreted as having any dependency or requirement relating to any one or combination of components illustrated in FIG. 1.

The principles of the present invention are operational with numerous other general-purpose or special-purpose computing or communications environments or configurations. Examples of well known computing systems, environments, and configurations suitable for use with the invention include, but are not limited to, mobile telephones, pocket computers, personal computers, servers, multiprocessor systems, microprocessor-based systems, minicomputers, mainframe computers, and distributed computing environments that include any of the above systems or devices.

In its most basic configuration, a computing system 100 typically includes at least one processing unit 102 and memory 104. The memory 104 may be volatile (such as RAM), non-volatile (such as ROM, flash memory, etc.), or some combination of the two. This most basic configuration is illustrated in FIG. 1 by the dashed line 106.

The storage media devices may have additional features and functionality. For example, they may include additional storage (removable and non-removable) including, but not limited to, PCMCIA cards, magnetic and optical disks, and magnetic tape. Such additional storage is illustrated in FIG. 1 by removable storage 108 and non-removable storage 110. Computer-storage media include volatile and non-volatile, removable and non-removable media implemented in any method or technology for storage of information such as computer-readable instructions, data structures, program modules, or other data. Memory 104, removable storage 108, and non-removable storage 110 are all examples of computer-storage media. Computer-storage media include, but are not limited to, RAM, ROM, EEPROM, flash memory, other memory technology, CD-ROM, digital versatile disks, other optical storage, magnetic cassettes, magnetic tape, magnetic disk storage, other magnetic storage devices, and any other media that can be used to store the desired information and that can be accessed by the computing system.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in software and hardware or hardware are also possible and contemplated.

Computing system 100 may also contain communication channels 112 that allow the host to communicate with other systems and devices over, for example, network 120.

Although the network 120 may include any network type (whether now existing or to be developed in the future), examples include Token Ring, Ethernet, Bluetooth, 802.11, USB, 1394, SMS, SOAP over IP, or the like. Communication channels 112 are examples of communications media. Communications media typically embody computer-readable instructions, data structures, program modules, or other data in a modulated data. By way of example, and not limitation, communications media include wired media, such as wired networks and direct-wired connections, and. The term computer-readable media as used herein includes both storage media and communications media.

The computing system 100 may also have input components 114 such as a keyboard, mouse, pen, a voice-input component, a touch-input device, and so forth. Output components 116 include screen displays, speakers, printer, etc., and rendering modules (often called "adapters") for driving them. The computing system 100 has a power supply 118. All these components are well known in the art and need not be discussed at length here.

Figure 2:
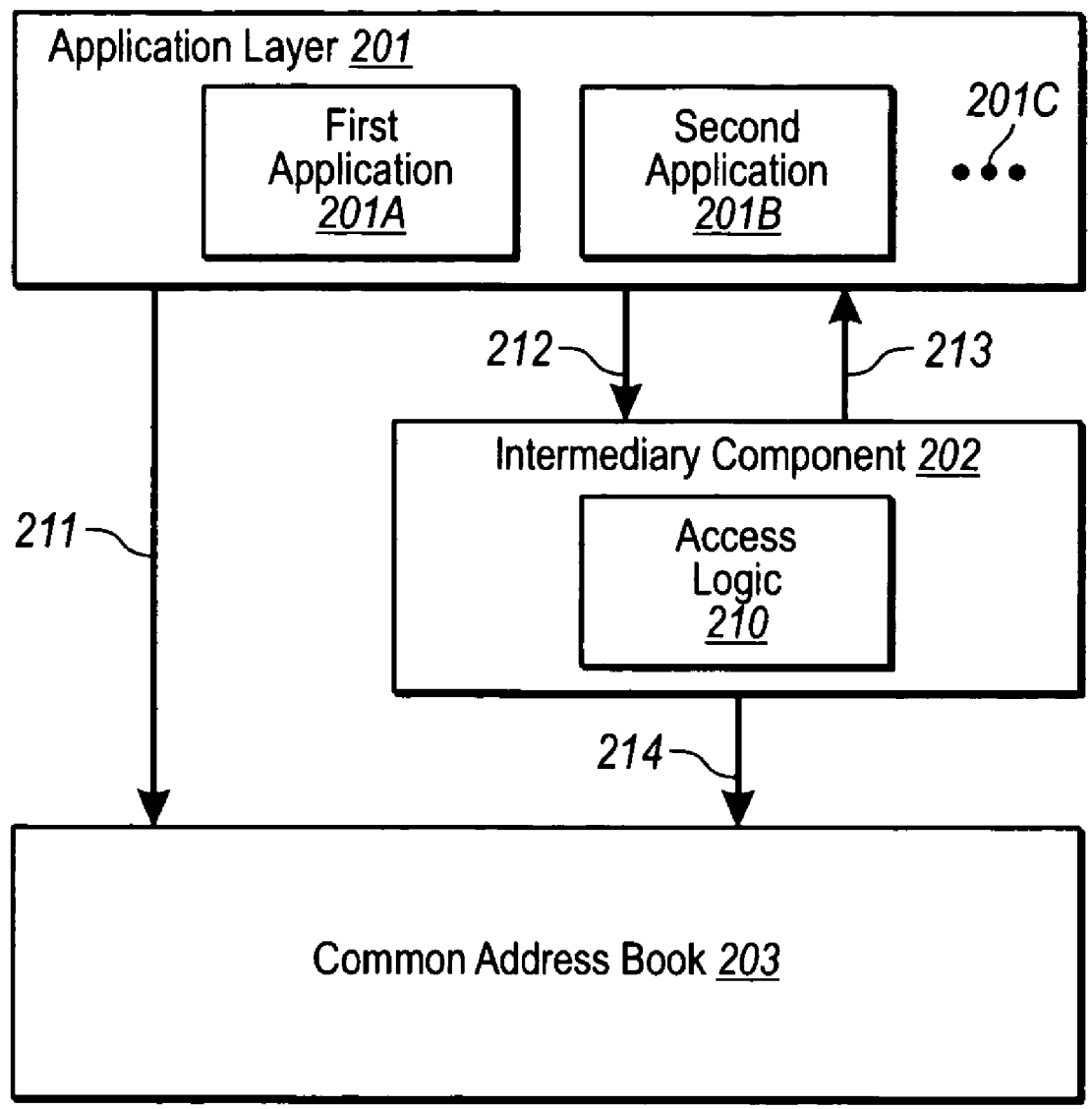
FIG. 2 illustrates a software architecture in which the principles of the present invention may be employed.

FIG. 2 illustrates a computing architecture 200 in which the principles of the present invention may be employed. The computing architecture 200 may be software, hardware, or a combination thereof and includes an application layer 201, an intermediary component 202, and a common address book 203. Computing architecture 200 may be implemented in a single computing system or device or it may be distributed over a network. For example, the application layer 201 may reside on a client while the common address book 203 resides on a server, or vice versa.

Application layer 201 is a conceptual idea that is shown for convenience in understanding the principles of the present invention. Application layer 201 includes first application 201A and second application 201B. Consequently, the use of the terms "first" and "second" does not represent any sequential, temporal or spatial ordering of the applications, but is used merely to distinguish one application from another. Application layer 201 may also include any number of additional applications as shown by horizontal ellipses 201C. All of the applications in application layer 201 may share the common address book 203 and may create groups in the common address book 203.

First application 201A and second application 201B may be a variety of different applications. For example, first application 201A may be an e-mail application while second application 201B is an instant messaging application or a corporate directory application. Alternatively, first application 201A may be an instant messaging application while second application 201B is an e-mail application or a corporate directory application. Additionally, first application 201A may be the corporate directory application while second application 201B may be an e-mail application or an instant messaging application. There may also be other combinations of applications as well.

The first application 201A may create a group within common address book 203 as represented by arrow 211. The intermediary component 202 may be used for the first application 201A to create a group without the common address book, although this is not required. The first application 201A may also create access logic 210 that controls access to the group. Creation of the access logic 210 allows the first application 201A to retain control over access to the group it has created.

When executed by the intermediary component 202, the access logic 210 may define and impose prerequisites that another application must satisfy for access to the group. Alternatively, the access logic 210 may specify and enforce which applications have access privileges. The access logic 210 may also control a user interface for accessing the created group. There may be other ways the access logic 210 controls access to the created group.

In this way, the first application 201A is able to maintain control over its created groups when using the common address book. In some embodiments, however, the first application 201A may not create access logic. The first application 201A may not desire to control access to the group it has created. The first application 201A registers with the intermediary component 202 so that the intermediary component 202 is aware of the first application 201A, and of its associated access logic 210 for the group (if any).

At some point, another application (hereinafter referred to as the "second" application 201B) may desire access to the group created by the first application 201A. The second application 201B makes a request for access to the group to an intermediary component 202 as represented by arrow 212. The request for access may be, for example, to modify a portion of the group, to delete a portion of the group, to add data to the group, to simply view or read the contents of the group, or the like.

The intermediary component 202, which may be a common address book Application Program Interface (API), determines that the requested group was created by the first application 201A. If the group was created by the first application 201A, the intermediary component 202 then determines whether or not there is access logic 210 to be executed.

As mentioned previously, in some cases the first application 202A does not create access logic 210 to control access to the requested group. When this is the case, access logic for the group created by first application 202A may not be created by another application. The lack of access logic 210 for execution may be inferred to mean that the first application 201A intends access for the requesting second application 201B. The intermediary component 202, upon finding no access logic 210 for execution, may simply grant access to the requested group within common address book 203 as represented by arrow 214.

There may be cases where access logic 210 is present, but intermediary component 202 does not execute the access logic. For example, the access logic 210 may be outdated or it may have become corrupt. As a result, the intermediary component 202 may be unable to execute the access logic 210. The intermediary component 202 may infer from the lack of an update to the access logic 210 that access for the requesting application is now desired. The intermediary component 202 may grant access to the requested group within common address book 203 as also represented by arrow 214. The second application 201B may then modify, delete, add to, or view the group, as requested.

In cases where the intermediary component 202 does find access logic 210, the access logic will be executed if there is no reason not to execute it. In response to the execution of the access logic 210, the intermediary component 203 determines if access to the group is proper. For example, if the access logic defines prerequisites for access, the intermediary component 202 determines if requesting second application 201B has satisfied these prerequisites. Alternatively, intermediary component 202 determines if the second application 201B has access privileges to the requested group or to a user interface for accessing the group. If the intermediary component 203 finds that access to the group is improper, access to the group is not granted and this result may be communicated back to the second application 201B as represented by arrow 213. The second application 201B may then satisfy the prerequisites, and repeat the request if desired.

On the other hand, if intermediary component 202 finds that the second application 201B has satisfied the prerequisites for access, then access to the group within the common address book 203 is granted as represented by arrow 214. The second application 201B may modify, delete, add to, or view the requested group depending on what type of access was requested. The entire process may be repeated as often as necessary whenever access to a group created by one application is requested by a different application.

In some embodiments of the present invention, first application 201A and second application 201B may be the same application. In this case, the application, for example an instant messaging application, creates a group and provides access logic 210 for access to the group as previously discussed. However, if the instant messaging application later desires to access the group it previously created, it still must make a request to the intermediary component 202 to gain access. The intermediary component 202 would then find and execute the access logic 210 and determine if access was proper in the manner described above.

Accordingly, execution of the access logic 210 may cause the intermediary component 202 to allow the second application 201B access to the group created by the first application 201A if the prerequisites are met as previously described. However, access to the group created by the first application 201A does not give the second application 201B access to modify or delete the existing access logic 210 created by the first application 201A. One application may not modify or delete access logic created by another application. This reinforces the control the creating application has over access to groups it has created.

Furthermore, if second application 201B wants to have the same group as the group created by the first application 201A, second application 201B would have to create a copy of the group with its own associated logic. This new group would be entirely separate, meaning that when the user made changes to the version of the group associated with the first application 201A, those changes would not be made to the second application 201B's version of the group. In this way, the first application 201A is able to maintain total control over access to the group it has created.

Figure 3:
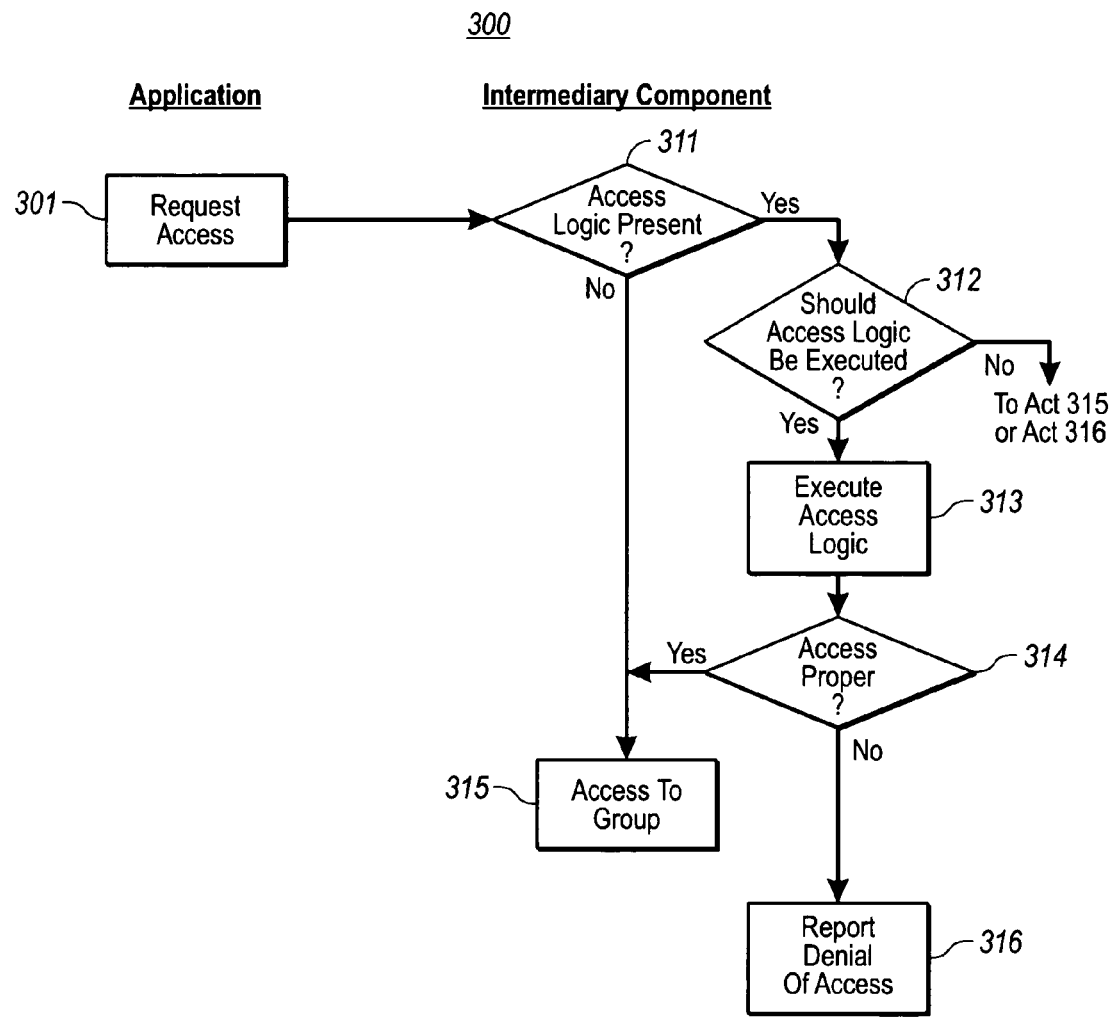
FIG. 3 illustrates a method for one application to request access to a group previously created in a shared common address book.

Having broadly described the principles of the present invention, a more detailed operation of particular embodiments will be described with respect to FIG. 3. FIG. 3 illustrates a flowchart of a method 300 for one application to request access to a group previously created in a shared common address book by another application or by the requesting application. The method may be performed by the environment 200 of FIG. 2. Some of the acts of the method are performed by an application while others are performed by an intermediary component.

An application desires access to a group already created in the shared common address book. This application may correspond to an application in application layer 201 of FIG. 2. The application makes a request for access to an intermediary component (act 301). The intermediary component may correspond to the intermediary component 202 of FIG. 2 and may be an Application Program Interface ("API").

The intermediary component then determines if there is any access logic associated with the requested group (decision block 311). If there is no logic associated with the requested group (NO in decision block 311), then the intermediary component may grant the requesting application access to the requested group (act 315). On the contrary, the intermediary component may also deny access and report the denial to the requesting application (act 316) as a default action to take should there be no logic associated with the requested group.

In the case where there is access logic associated with the requested group (YES in decision block 311), the intermediary component determines if the access logic should be executed (decision block 312). For example, if the access logic is outdated or corrupt, the intermediary component should not execute the access logic (NO in decision block 312), and may instead simply grant access to the requested group (act 315), or alternatively the intermediary component may deny access and report the denial of access to the requesting application (act 316), whichever default action is appropriate. If the access logic should be executed (YES in decision block 312), the intermediary component will execute the logic (act 313).

The intermediary component will use the executed logic to determine if access to the requested group is proper (decision block 314). If access is found to be proper for the requesting application (YES in decision block 314), access to the requested group will be granted by the intermediary component (act 316). However, if access is found not to be proper for the requesting application (NO in decision block 314), the intermediary component communicates the denial of access to the requesting application (act 316).

Specific examples of the present invention will now be described with respect to FIG. 3. In one example, suppose that a contacts group has previously been created in the shared common address book and that access logic is associated with this group. An offline instant messaging application desires to add a contact to the existing group. The application makes a request to the intermediary component, which in this case may be an API, for access to the group (act 301).

The API determines that there is access logic (act 311) and that the logic should be executed (act 312). The API executes the access logic (act 313) and uses the executed access logic to determine if the instant messaging application has met the required prerequisites for access to the requested group (act 314). In this case, one of the prerequisites for access may require the application to be online when making the request for access. The API denies access and communicates this to instant messaging application (act 316).

The instant messaging application may then prompt the user to go online to complete the change to the group and when the user goes online, the application again makes a request to the API for access to the contacts group (act 301.) The API component again determines that there is associated access logic (act 311) and that the access logic should be executed (act 312). The API executes the access logic (act 313) and uses the logic to determine that all the prerequisites for access have been satisfied (act 314). Since the application is now online, the API determines that access to the contacts group is proper and access is granted (act 315). The new contact is added to the contracts group. Note that the instant messaging application could also choose to store the request in a pending queue and then issue all pending requests the next time the user goes on line with the application.

In another example, suppose that a mailing label application desires to access a group of mailing addresses that was previously created by another application. Suppose further that there is no access logic associated with the group.

The application makes a request for access to the API (act 301). The API then evaluates the group to see if there is any access logic associated with the group (act 311). In this case, the API finds no access logic and so access to the group is granted (act 315). The mailing label application may access the mailing addresses in the group.

The principles of the present invention relate to a method for one application to retain control over access to a group created in a shared common address book. The method makes possible the use of the shared common address book by multiple applications. By retaining control over access to the groups it has created, an application can freely share the information in a group with other applications without the risk of undesired applications gaining access improperly. Accordingly, the principles of the present invention are a significant advancement in the art of address book groups.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment in which there are a plurality of applications that each work with a common address book, a method for a first application of the plurality of applications to control access to data within the common address book, the method comprising:
    an act of a first application of a plurality of applications adding data to a common address book that is stored in one or more computer tangible storage media in a computing environment;
    an act of the first application specifying access logic that defines prerequisites that an application requesting access to the added data must meet before being granted access to the added data, wherein an intermediary component executes the access logic to determine whether the application requesting access is to be granted access to the added data, and wherein the access logic specifies that an application requesting access to the added data must be online while making the request;
    an act of a second application of the plurality of applications providing a request to the intermediary component, the request being for access to the added data within the common address book;
    an act of the intermediary component determining that the added data the is associated with the specified access logic;
    an act of the intermediary component executing the access logic determining and when in response to the act of executing the access logic;
    an act of granting the second application access to the requested of added data within the common address book if the second application is online while making the request such as to meet the prerequisites defined by the access logic and an act of not granting the second application access to the of added data within the common address book if the second application is offline while making the request such as to not meet the prerequisites defined by the access logic.

2. A method in accordance with claim 1, wherein the request for access to the added data is a request to modify, delete, add, or view the added data within the common address book.

3. A method in accordance with claim 1, wherein the intermediary component is a common address book application program interface.

4. A method in accordance with claim 1, wherein the first application is an e-mail application and the second application is an instant messaging application.

5. A method in accordance with claim 1, wherein the first application is an instant messaging application and the second application is an e-mail application.

6. A method in accordance with claim 1, wherein the first application is an e-mail application and the second application is a corporate directory application.

7. A method in accordance with claim 1, wherein the first application is a corporate directory application and the second application is an e-mail application.

8. A method in accordance with claim 1, wherein the first application is an instant messaging application and the second application is a corporate directory application.

9. A method in accordance with claim 1, wherein the first application is a corporate directory application and the second application is an instant messaging application.

10. A method in accordance with claim 1, wherein the second application meeting the prerequisites defined by the access logic comprises:
    the access logic specifying the second application as an approved application for accessing the added data; and
    the second application being online at the time of the request.

11. A method in accordance with claim 1, wherein the act of not granting the second application access to the added data within the common address book further comprises:
    an act of the intermediary component communicating to the second application that the request for access to the added data within the common address book has not been granted.

12. A computer program product for use in a computing environment in which there are a plurality of applications that each work with a common address book, the computer product for implementing a method for a first application of the plurality of applications to control access to data within the common address book, the computer program product comprising:
    one or more computer tangible storage media having stored thereon computer-executable instructions that, when executed by one or more processors of the computing environment, cause the computing environment to perform the method, the method comprising the following:
    an act of a first application of a plurality of applications adding data to a common address book;
    an act of the first application specifying access logic that defines prerequisites that an application requesting access to the added data must meet before being granted access to the added data, wherein an intermediary component executes the access logic to determine whether the application requesting access is to be granted access to the added data, and wherein the access logic specifies that an application requesting access to the added data must be online while making the request;
    an act of a second application of the plurality of applications providing a request to an the intermediary component, the request being for access to the added data within the common address book;
    an act of the intermediary component determining that the added data is associated with the specified access logic;
    an act of the intermediary component executing the access logic; and
    in response to the act of executing the access logic;
    an act of granting the second application access to the added data within the common address book if the second application is online while making the request such as to meet the prerequisites defined by the access; and an act of not granting the second application_access to the added data within the common address book if the second application is offline while making the request such as to not meet the prerequisites defined by the access logic.

13. A computer program product in accordance with claim 12, wherein the request for access to the added data is a request to modify, delete, add or view the added data within the common address book.

14. A computer program product in accordance with claim 12, wherein the intermediary component is a common address book application program interface.

15. A computer program product in accordance with claim 12, wherein the first application is an e-mail application and the second application is an instant messaging application.

16. A computer program product in accordance with claim 12, wherein the first application is an instant messaging application and the second application is an e-mail application.

17. A computer program product in accordance with claim 12, wherein the second application meeting the prerequisites defined by the access logic comprises:

the access logic specifying the second application as an approved application for accessing the added data; and
the second application being online at the time of the request.

18. A computer program product in accordance with claim 12, wherein the act of not granting the second application access to the added data within the common address book further comprises:

an act of the intermediary component communicating to the second application that the request for access to the added data within the common address book has not been granted.

19. A computer program product in accordance with claim 12, wherein the added data comprises a group of address entries in the common address book.

20. A computer program product in accordance with claim 12, wherein the access logic further defines a user interface by which the application requesting access displays the added data.

* * * * *